United States Patent
Zhuang et al.

(10) Patent No.: US 7,758,758 B2
(45) Date of Patent: Jul. 20, 2010

(54) METHOD FOR TREATING ACIDIC WATERS USING RECYCLED ACIDIC AND BASIC SLUDGES

(75) Inventors: J. Ming Zhuang, Coquitlam (CA); Anthony S. Walsh, Vancouver (CA)

(73) Assignee: Noram Engineering and Constructors Ltd., Vancouver (CA)

( * ) Notice: Subject to any disclaimer, the term of this patent is extended or adjusted under 35 U.S.C. 154(b) by 505 days.

(21) Appl. No.: 11/680,585

(22) Filed: Feb. 28, 2007

(65) Prior Publication Data

US 2007/0205159 A1 Sep. 6, 2007

Related U.S. Application Data

(60) Provisional application No. 60/777,589, filed on Mar. 1, 2006.

(51) Int. Cl.
*C02F 1/62* (2006.01)
*C02F 101/20* (2006.01)

(52) U.S. Cl. ............... 210/713; 210/725; 210/727; 210/730; 210/912

(58) Field of Classification Search ............... 210/713
See application file for complete search history.

(56) References Cited

U.S. PATENT DOCUMENTS

| | | | | |
|---|---|---|---|---|
| 3,617,559 A | * | 11/1971 | Cywin | 210/713 |
| 4,320,012 A | | 3/1982 | Palm et al. | |
| 5,039,428 A | * | 8/1991 | Wentzler et al. | 210/711 |
| 5,427,691 A | * | 6/1995 | Kuyucak et al. | 210/713 |
| 5,462,670 A | * | 10/1995 | Guess | 210/713 |
| 6,863,819 B2 | * | 3/2005 | Maree | 210/631 |
| 7,033,507 B2 | * | 4/2006 | Zhuang | 210/714 |
| 2004/0094484 A1 | | 5/2004 | Zhuang | |

\* cited by examiner

*Primary Examiner*—Peter A Hruskoci
(74) *Attorney, Agent, or Firm*—Oyen Wiggs Green & Mutala LLP

(57) ABSTRACT

A method for removing metals from metal-containing acidic mine wastewater uses a basic sludge produced by the method for treating the wastewater. The wastewater is mixed with a lime slurry and with the basic sludge. This mixture is allowed to separate into an aqueous effluent and an acidic sludge. The effluent is mixed with the lime slurry and with a composition containing an iron compound, to produce a mixture. This mixture is allowed to separate into an aqueous effluent and the basic sludge. Lignin derivatives, such as calcium lignosulfonate, may be included in the treatment mixture.

9 Claims, 1 Drawing Sheet

METHOD FOR TREATING ACIDIC WATERS USING RECYCLED ACIDIC AND BASIC SLUDGES

CROSS-REFERENCE TO RELATED APPLICATION

This application claims the benefit of provisional application No. 60/777,589, filed Mar. 1, 2006.

TECHNICAL FIELD OF THE INVENTION

This invention pertains to the treatment of water to remove metal contaminants therefrom. More particularly, it pertains to a process for the removal of metals from acidic mine wastewaters, using acidic and basic sludges.

BACKGROUND OF THE INVENTION

Acid rock drainage (ARD) is a natural process that occurs when sulfur-containing compounds in rock are exposed to air and water. When this process occurs in the context of mining operations, where sulfur-containing rocks are exposed as a result of open pit or underground mining, the process, and the acidic water it produces, is referred to as acid mine drainage (AMD). The process produces acidic waters as a result of the oxidation of the minerals pyrite ($FeS_2$) and pyrotite (FeS) and other sulfur-containing compounds, generating sulfuric acid. The pH of the acidic waters is typically about 2.1 to 3.5. This low pH causes the water to leach metals from the rock and soils in contact therewith. Other mine wastewaters resulting from the operation of a mine, whether an underground or an open pit mine, including the water used in the operating process of the mine and from mill clean-up, are also often highly acidic. All such wastewaters, including ARD and AMD, are collectively referred to in this specification as "acidic mine wastewaters" (AMW).

The contamination of water supplies by metals in acidic mine wastewaters is a serious environmental concern. For example, the metals dissolved in such waters may kill fish and other aquatic life, and may pose human health hazards when they find their way into drinking water supplies.

One known method for treating AMW, using lime to precipitate metals as hydroxides, is the high density sludge (HDS) process. In this process, an excess amount of lime is applied to neutralize the acidity of the water and raise the pH to about 9-10. An appropriate flocculent is then added and the mixture is transferred to a clarifier, from which clean effluent is decanted from a sludge. There are a number of disadvantages with this process. It uses large amounts of lime, is very time-consuming, and requires handling a large quantity of sludge and further treatment of the sludge to stabilize it because metal hydroxides in the sludge tend to resolubilize if the pH changes. The process also requires expensive equipment to handle lime slurry. It frequently requires modification for removal of various metals to meet local environmental regulations. The lime also tends to become coated by metal precipitates at high metal contaminant levels, increasing lime consumption and therefore cost.

Kuyucak et al. (U.S. Pat. No. 5,427,691) discloses a modification of the HDS process to neutralize ARD in a two-stage process employing two reactors, instead of one-stage neutralization with lime and recycled sludge in the HDS process. The patent states that in the first reactor, a mixture of lime slurry and recycled sludge raises the pH of ARD to 4-4.5 to precipitate ferric hydroxide only. Then, the precipitates of ferric hydroxide can act as nuclei to promote crystallization in the second reactor where the pH of water is raised to 9-10 with lime and recycled sludge, under aeration. The generated sludge is separated from effluent at pH 9-10. Some portions of sludge are recycled and the remaining parts are disposed of. However, this improvement does not change the essential properties of sludge, nor reduce lime consumption significantly.

Zhuang (US Patent Publication 2004/0094484-A1, dated May 20, 2004) discloses a method using lignin derivatives to treat AMW. The combination and dispersion properties of lignosulfonates are utilized in this method, which may be referred to as the "lignin alkali coagulant method" (LACM), to combine metals as colloids for protecting lime from developing an external coating, resist precipitate fouling and scale formation, lubricate the smooth flow of both liquid and solid wastes, promote sludge flocculation and coagulation, and benefit the stability of the sludge. In treating AMW containing high levels of metals, the use of small amounts of lignosulfonates results in less lime consumption and a better quality of treated water, in comparison with conventional lime neutralization treatment (CLNT). However, the reduction in lime consumption achieved by this process is limited.

New technologies are needed to decrease sludge volume, improve the long-term stability of sludge under seasonal conditions, and minimize the lime coating problem and reduce lime consumption.

SUMMARY OF THE INVENTION

It is one object of the invention to provide a process which recycles the basic sludge that is separated from the treated effluent, using its alkalinity as a neutralizing agent in the pretreatment phase of the process.

It is another object of the invention to convert the basic sludge to a more stable, acidic sludge, by leaching unstable metal precipitates from it.

It is another object of the invention to reduce the amount of lime that is required for effectively treating acidic mine wastewater.

It is another object of the invention to reduce the amount of sludge produced by an acidic mine wastewater treatment process, thus minimizing disposal volumes, a result of using lesser amounts of lime.

The invention provides a method for removing metals from metal-contaminated acidic mine wastewaters. The wastewater is mixed with a lime slurry and with the basic sludge that is produced by the process, to form a mixture. That mixture is allowed to separate into an aqueous effluent and an acidic sludge. The effluent is mixed with a lime slurry and with added iron, which is provided either by adding some of the acidic sludge or an iron solution, or both. The mixture produced is allowed to separate into an aqueous effluent (i.e. the treated acidic mine wastewater, which can be released to the environment) and a basic sludge (which is then used in the process).

In general terms, the process of the invention can be considered as comprising a pretreatment phase and a treatment phase. In a preferred embodiment, in the pretreatment phase, the acidic mine wastewater is mixed with lime and recycled basic sludge (from the treatment phase) and acidic sludge is formed, separated and removed, most for disposal, some for use in the treatment phase. The effluent from this pretreatment phase, i.e. the pretreated acidic mine wastewater, is then sent to the treatment phase, in which it is mixed with lignin derivatives, such as lignosulfonates (a preferred but optional step) and with lime, recycled acidic sludge (from the pretreatment phase) and a ferrous or ferric solution. Basic sludge settles out and is removed, leaving the treated effluent.

The process produces a high quality effluent with sufficiently low metal content that it can be released to the environment. The process can reduce the amount of lime consumed by over 30% and reduce the amount of sludge for disposal by more than 25%, in comparison with the conventional lime neutralization treatment.

DETAILED DESCRIPTION OF THE PREFERRED EMBODIMENT

Figure 1:
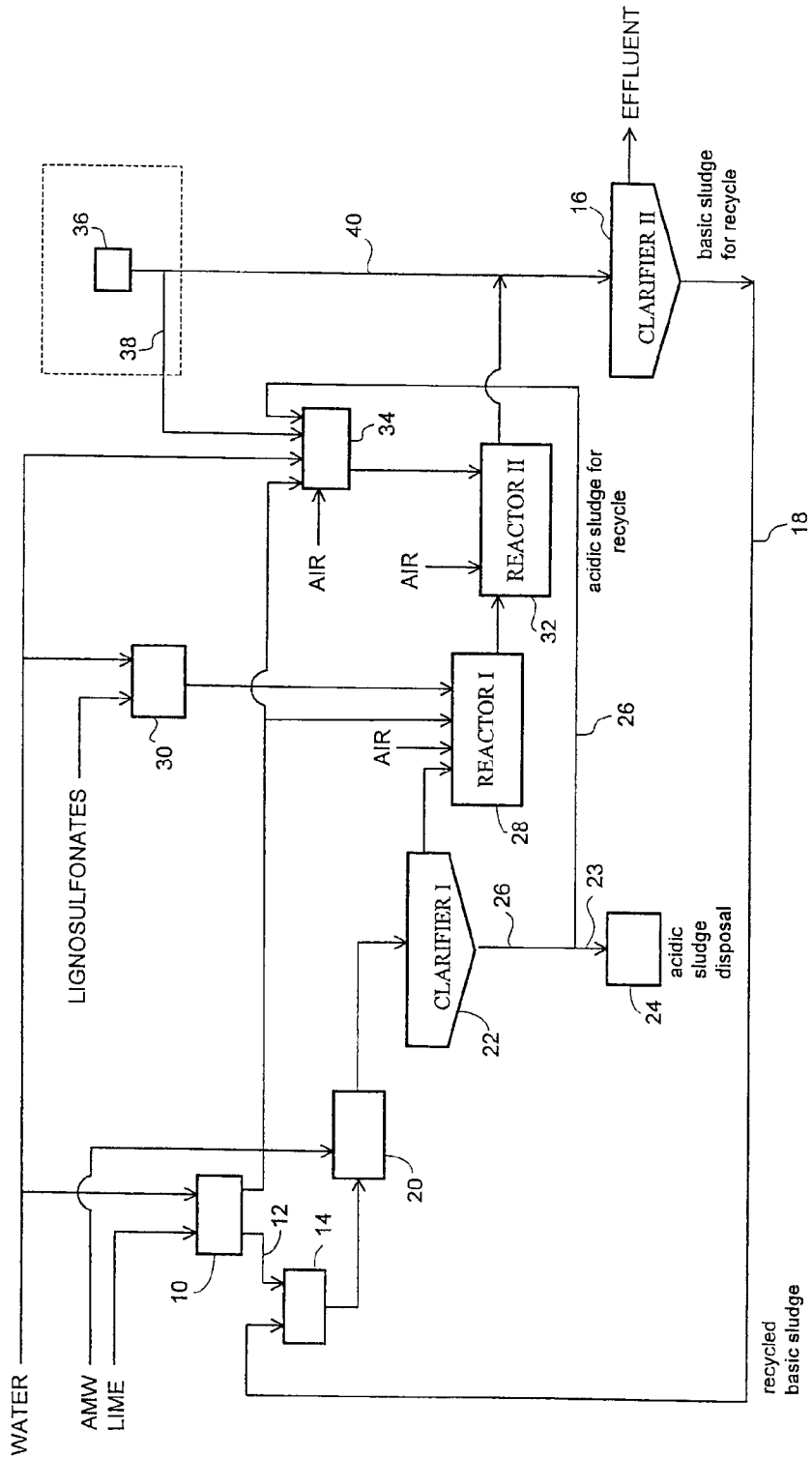
FIG. 1 is a flow diagram showing a preferred embodiment of the process of the invention.

Referring to the flow diagram of FIG. 1, lime and water are mixed in a tank 10 to form a lime slurry, which is passed through a conduit 12 to a tank 14, in which the slurry is mixed with the basic sludge that is produced by the treatment process (as discussed below), which passes into tank 14 from a clarifier 16 through a conduit 18.

The lime that is used in the process is preferably a lime compound which includes one or more of hydrated lime ($Ca(OH)_2$), quicklime (CaO), and limestone ($CaCO_3$).

This mixture of lime slurry and recycled basic sludge in the tank 14 is passed to a pretreatment tank 20, where it is mixed with the acidic mine wastewater (AMW) to be treated. The AMW, which has a pH that is typically in the range of 2.1 to 3.5, is neutralized to a pH of about 4-6, preferably 4.3 to 5. Mixing in the tank 20 is carried out for about 15-60 minutes, preferably 15-30 minutes.

All of the basic sludge produced in the clarifier 16 is passed to the tank 14 and used in the pretreatment of the AMW. The amount of the basic sludge used per liter of AMW is preferably in the range of 2-25 grams, more preferably 5-12 grams.

The amount of lime that is required in order to achieve a pH of 4-5 in the mixture in the pretreatment tank 20 depends on the acidity of the AMW and the alkalinity of the recycled basic sludge. The amount of lime is varied as required to achieve and maintain this target pH range.

The mixture in the tank 20 is passed into a first clarifier 22, in which an acidic sludge precipitates out.

The basic sludge produced in the clarifier 16 comprises metal precipitates in Lewis base form. During the pretreatment of the AMW, the unstable metal precipitates in the basic sludge are leached into the aqueous solution in pretreatment tank 20, which has a pH of 4-5. The acidic sludge that is then formed is composed of stable metal precipitates in Lewis acid form. The acidic sludge has desirable handling properties, including high density, dewaterability and high stability.

Most of the acidic sludge is separated from the effluent in the clarifier 22 and is sent through a conduit 23 to a sludge disposal 24. A small portion of the acidic sludge produced, preferably 1-10% by weight, more preferably 4 to 8%, is passed through a conduit 26 to be recycled in the treatment process, as discussed below.

The effluent from the clarifier 22 is passed to a first reaction vessel 28, which is a mixing tank. Lime slurry from the tank 10 and aqueous lignosulfonate suspension from a tank 30 are added and aeration is carried out. The mixture is mixed and reacted for about 10-20 minutes to raise the pH of the solution to a pH in the range of about 8-10, preferably 9-10. This neutralized water is then passed to a second reaction vessel 32, which is also a mixing tank. Here, it is mixed, under aeration, with a mixture that is prepared under aeration in a tank 34, comprising lime slurry, water and recycled acidic sludge. In addition, a ferrous solution, preferably a ferrous chloride salt solution, may be provided from a tank 36 through a conduit 38 into the tank 34 for mixing with the other components.

The mixture is retained in the second reactor 32 for about 10 minutes and is then transferred into the second clarifier 16.

Rather than a ferrous solution, tank 36 may alternatively contain a ferric solution such as ferric chloride, which is passed through a conduit 40 to the feed of the second clarifier 16. Most of the ferric in the water (whether initially present or added at this stage) is removed in the process together with other metal precipitates as part of the acidic sludge. The presence of ferric in the acidic sludge can improve its stability, density and dewaterability. The removal of the iron in the acidic sludge also minimizes iron fouling during subsequent treatment stages.

In the second clarifier 16, the basic sludge settles out. It is recycled to the tank 14, through a conduit 18. The effluent, having a pH of about 8.5-9.5, is discharged from the clarifier 16.

The recycled acidic sludge that is used furnishes precipitation nuclei which assist in co-precipitating the metals that are still present in the AMW in the second reactor 32.

The step of using recycled acidic sludge and the step of adding a ferrous or ferric solution (from tank 36) may be considered as two alternative ways of getting sufficient iron into the second reactor 32 to effectively co-precipitate metals. In some cases, both the steps will be carried out in the process, but in other cases only one step or the other will be used. For example, if the level of iron in the raw AMW is relatively high, and the amount of acidic sludge that is recycled is sufficient, the step of adding ferrous or ferric solution will not be necessary. Accordingly, the step of adding a ferrous or ferric solution will be preferred in the treatment of AMW which contains only low levels of iron. Similarly, the step of using recycled acidic sludge can be avoided by the addition of sufficient ferrous or ferric solution to provide adequate iron levels in the second reactor 32.

The lignin derivatives lignosulfonates used in the invention are preferably lignosulfonates, kraft lignin and sulfonated kraft lignin salts, and mixtures thereof. The lignosulfonates include ammonium, sodium, potassium, magnesium and calcium lignosulfonates. The lignin derivatives are commercially available as by-products of pulp mill processes.

It will be understood that an apparatus to carry out the process illustrated schematically in FIG. 1 would include pumps, air compressors and conduits, controllers, mixers, etc., which are well known to persons skilled in the art. The process is preferably operated as a continuous process, treating an incoming stream of AMW; however, it can also be operated as a batch process.

EXAMPLES

In order to prepare a basic sludge for the first pretreatment trial, and to provide a basis for measuring the reduction in lime consumption and in sludge volume achieved by the process of the invention, preliminary trials were carried out by treating AMW using (a) conventional lime neutralization treatment (CLNT), and (b) the lignin alkali coagulent method (LACM) of Zhuang (U.S. Patent Publication No. 2004/0094484 A1 published May 20, 2004). The AMW used in all the examples was taken from an abandoned mine site and it had the pH and metal content set out in Table 1. The results of these preliminary tests, using hydrated lime in the CLNT method and both hydrated lime and lignosulfonates in the LACM method. The pH and metal content of the effluent was measured and the test results are summarized in Table 1.

TABLE 1

|  |  | LACM | CLNT |
|---|---|---|---|
| Treatment chemicals used | Lignosulfonates, g/L | 0.198 | 0 |
|  | hydrated Lime, g/L | 8.208 | 9.242 |
| Sludge | TSS[(1)], mg/L | 41.4 | 64.5 |
|  | Sludge Mass, g/L | 26.52 | 26.45 |
| pH | Influent (AMW) 2.4–2.6 |  |  |
|  | Effluent: | 7.9–8.0 | 7.9–8. |
| Dissolved Metals | Dissolved Metals in influent (AMW) (mg/L) | Dissolved metals in effluent (mg/L) | Dissolved metals in effluent (mg/L) |
| Al | 960 | 0.89 | 0.9 |
| As | 3.0 | <0.02 | <0.2 |
| Ca | 459 | 505 | 683 |
| Cd | 1.62 | 0.003 | <0.01 |
| Co | 5.15 | <0.005 | <0.05 |
| Cr | 0.33 | <0.005 | <0.05 |
| Cu | 82.4 | 0.03 | <0.1 |
| Fe | 957 | <0.01 | <0.1 |
| Mg | 1310 | 645 | 782 |
| Mn | 181 | 2.07 | 3.79 |
| Ni | 10.8 | <0.005 | <0.05 |
| P (as $PO_4^{-3}$) | 74.8 | <0.5 | <0.9 |
| Pb | <0.2 | <0.02 | <0.2 |
| S (as $So_4^{-2}$) | 13110 | 4101 | 5010 |
| Sb | <0.2 | <0.02 | <0.2 |
| Si | 33.5 | 0.21 | <0.5 |
| Zn | 178 | <0.005 | <0.05 |

Note:
[(1)]Total suspension solids in the effluent.

Example 1

Seven trials were carried out. The basic sludge separated from each previous trial was mixed with hydrated lime prior to being used for the pretreatment of the next trial. Table 2 lists the pretreatment data obtained from seven continuous trials identified as P-1 to P-7. The basic sludge obtained from the preliminary LACM method (Table 1) was used for the first pretreatment (P-1). Table 3 lists the treatment data for seven continuous trials, identified as TP-1 to TP-7.

The pretreatment of AMW was carried out by mixing the recycled basic sludge with hydrate lime (2.2-2.4 g/L) or limestone (3.0 g/L), followed by mixing with AMW (1 L) in a container. The water solution was gently stirred for about 30 minutes. It took about 20 to 30 minutes for the acidic sludge to settle. The pH of water layer was in a range of 4 to 5. A small sample of pretreated AMW was taken for determining the dissolved metals content, using the ICP method. The pretreated AMW (1 L) was decanted to a 1-L glass beaker for the next treatment. The acidic sludge was separated for Toxicity Characteristic Leaching Procedure (TCLP, US EPA Method 1311) test.

The water solution (i.e. the pretreated AMW) was vigorously stirred under aeration using an air-sparger. The airflow was controlled at 1 LPM. An amount of 0.04-0.07 g of sodium lignosulfonates was then added to the water solution. It took about 15 to 30 minutes while adding hydrate lime (2.5-3.5 g/L) to raise the pH to 8 to 10. That was followed by an addition of small amounts of recycled acidic sludge (0.7-2.0 g/L) from the pretreatment (in TP-1 to -4, Table 3), or of a mixture of recycled acidic sludge and ferrous chloride salt solution (in TP-1). This reduced the pH of water to about 8.5-9.5 after 10 more minutes reaction. The water was transferred into a 1-L glass cylinder for sludge settling. For trials TP-5 and TP-6, as an alternative to the use of ferrous salt solution, ferric chloride solution (41% by wt., 0.10-0.16 g/L) was injected into the water either with (TP-4) or without (TP-5) addition of the acidic sludge, prior to transferring the water into the glass cylinder. After 50-60 minutes of settling, about 200 mL of top water layer was taken from the glass cylinder for total dissolved solids (TSS) and dissolved metals analysis by the standard ICP method.

The levels for leachable metals in the acidic sludge produced by the process (from pre-treatment trials P-3 to P-7) were measured using a Toxicity Characteristics Leaching Procedure (TCLP) extraction. The results are set out in Table 4.

TABLE 2

Pretreatment Data for AMW

|  |  | Pretreatment Trial No. | | | | | | |
|---|---|---|---|---|---|---|---|---|
|  |  | P-1 | P-2 | P-3 | P-4 | P-5 | P-6 | P-7 |
| Treatment chemicals used | Limestone/g/L | 0 | 0 | 0 | 3.02 | 0 | 0 | 0 |
|  | Hydrated lime, g/L | 2.23 | 2.30 | 2.34 | 0 | 2.20 | 2.39 | 2.42 |
|  | Basic sludge mass, g/L | 20.3 | 17.0 | 11.5 | 5.8 | 5.9 | 6.1 | 10.2 |
| Acidic sludge | Total sludge mass produced, g/L | 33.77 | 26.80 | 20.96 | 16.44 | 15.03 | 16.98 | 20.37 |
|  | Sludge disposal mass, g/L | 27.93 | 25.01 | 20.18 | 15.50 | 15.03 | 16.21 | 19.70 |
| pH | Influent (AMW) 1.4–2.6 |  |  |  |  |  |  |  |
|  | Effluent: | 4.05 | 4.25 | 4.67 | 5.04 | 4.32 | 4.35 | 4.68 |
| Dissolved Metals | Dissolved metals in influent (mg/L) | Dissolved metals in effluent (mg/L) | | | | | | |
| Al | 960 | 577 | 258 | 46.3 | 2.9 | 142 | 144 | 47.5 |
| As | 3.0 | <0.2 | <0.2 | <0.2 | <0.2 | <0.2 | <0.2 | <0.2 |
| Ca | 459 | 444 | 430 | 502 | 706 | 422 | 468 | 474 |
| Cd | 1.62 | 2.15 | 2.30 | 3.35 | 3.16 | 3.40 | 3.87 | 3.44 |
| Co | 5.15 | 7.10 | 7.11 | 10.2 | 10.1 | 10.5 | 10.9 | 10.3 |
| Cr | 0.33 | 0.12 | 0.10 | <0.05 | <0.05 | <0.05 | <0.05 | <0.05 |
| Cu | 82.4 | 53.1 | 52.6 | 41.4 | 7.6 | 55.2 | 49.4 | 42.8 |
| Fe | 957 | 3.9 | 1.4 | 0.1 | <0.1 | 0.3 | 0.3 | <0.1 |
| Mg | 1310 | 1406 | 1238 | 1645 | 1566 | 1487 | 1527 | 1525 |
| Mn | 181 | 232 | 200 | 252 | 244 | 240 | 231 | 220 |
| Ni | 10.8 | 13.9 | 14.0 | 19.7 | 19.1 | 19.6 | 19.2 | 19.3 |

TABLE 2-continued

Pretreatment Data for AMW

|  |  | Pretreatment Trial No. |  |  |  |  |  |  |
|---|---|---|---|---|---|---|---|---|
|  |  | P-1 | P-2 | P-3 | P-4 | P-5 | P-6 | P-7 |
| P (as $PO_4^{-3}$) | 74.8 | 1.2 | <0.9 | 2.0 | <0.9 | <0.9 | <0.9 | <0.9 |
| Pb | <0.2 | <0.2 | <0.2 | <0.2 | <0.2 | <0.2 | <0.2 | <0.2 |
| S (as $SO_4^{-2}$) | 13110 | 10318 | 8003 | 8860 | 8532 | 8556 | 9171 | 8652 |
| Sb | <0.2 | <0.2 | <0.2 | <0.2 | <0.2 | <0.2 | <0.2 | <0.2 |
| Si | 33.5 | 19.0 | 19.3 | 17.8 | 11.2 | 12.1 | 11.4 | 12.6 |
| Zn | 178 | 233 | 245 | 335 | 302 | 355 | 363 | 352 |

TABLE 3

The Treatment Data for Pretreated AMW

|  |  |  | Treatment Trial No. |  |  |  |  |  |  |
|---|---|---|---|---|---|---|---|---|---|
|  |  |  | TP-1 | TP-2 | TP-3 | TP-4 | TP-5 | TP-6 | TP-7 |
| Treatment chemicals used | Sodium Lignosulfonates, g/L | | 0.064 | 0.046 | 0.046 | 0.053 | 0.065 | 0.058 | 0.069 |
| | Hydrated lime, g/L | | 3.500 | 3.643 | 2.552 | 2.464 | 3.078 | 3.389 | 2.825 |
| | $FeCl_3$ (41%), g/L | | — | — | — | — | 0.161 | 0.100 | — |
| | $FeCl_2$ (100%), g/L | | — | — | — | — | — | — | 0.147 |
| | Acidic sludge mass, g/L | | 5.84 | 1.79 | 0.78 | 0.94 | — | 0.77 | 0.67 |
| Basic sludge pH | TSS mg/L | | 51 | 51 | 73 | 68 | 48 | 16 | 24 |
| | Sludge mass, g/L | | 17.4 | 11.6 | 5.90 | 6.03 | 6.64 | 10.44 | 6.46 |
| | Influent (AMW) 2.4–2.6 | | | | | | | | |
| | Effluent: | | 7.2–7.4 | 7.6–7.8 | 8.4–8.6 | 8.7–8.9 | 8.7–8.9 | 8.6–8.8 | 9.0–9.2 |
| Dissolved Metals | Dissolved metals in influent (mg/L) | | Dissolved metals in effluent (mg/L): | | | | | | |
| Al | | 960 | 0.3 | 0.6 | <0.2 | <0.2 | <0.2 | <0.2 | <0.2 |
| As | | 3.0 | <0.2 | <0.2 | <0.2 | <0.2 | <0.2 | <0.2 | <0.2 |
| Ca | | 459 | 503 | 926 | 1199 | 1178 | 1329 | 824 | 582 |
| Cd | | 1.62 | 0.06 | 0.02 | 0.03 | 0.01 | 0.04 | 0.03 | 0.02 |
| Co | | 5.15 | <0.05 | <0.05 | <0.05 | <0.05 | <0.05 | <0.05 | <0.05 |
| Cr | | 0.33 | <0.05 | <0.05 | <0.05 | <0.05 | <0.05 | <0.05 | <0.05 |
| Cu | | 82.4 | <0.1 | <0.1 | <0.1 | <0.1 | <0.1 | <0.1 | <0.1 |
| Fe | | 957 | <0.1 | <0.1 | <0.1 | <0.1 | <0.1 | <0.1 | <0.1 |
| Mg | | 1310 | 1071 | 560 | 829 | 841 | 933 | 765 | 884 |
| Mn | | 181 | 18.9 | 1.52 | 0.94 | 0.62 | 1.75 | 1.73 | 0.36 |
| Ni | | 10.8 | <0.05 | <0.05 | <0.05 | <0.05 | <0.05 | <0.05 | <0.05 |
| P (as $PO_4^{-3}$) | | 74.8 | <0.9 | <0.9 | <0.9 | <0.9 | <0.9 | <0.9 | <0.9 |
| Pb | | <0.2 | <0.2 | <0.2 | <0.2 | <0.2 | <0.2 | <0.2 | <0.2 |
| S (as $SO_4^{-2}$) | | 13110 | 3213 | 4414 | 6080 | 5965 | 6872 | 5148 | 4953 |
| Sb | | <0.2 | <0.2 | <0.2 | <0.2 | <0.2 | <0.2 | <0.2 | <0.2 |
| Si | | 33.5 | <0.5 | 0.7 | 1.0 | 0.9 | 1.0 | 1.0 | 0.8 |
| Zn | | 178 | 0.058 | <0.05 | <0.05 | <0.05 | <0.05 | <0.05 | <0.05 |

TABLE 4

The TCLP Data for Acidic Sludge of Example 1

|  | Acidic Sludge from Trial No.: | | | | | Regulatory Limit[1,2] |
|---|---|---|---|---|---|---|
|  | P-3 | P-4 | P-5 | P-6 | P-7 | |
| Solids % | 74.6 | 81.9 | 81.3 | 30.0 | 82.4 | — |
| Final pH of leachate | 4.82 | 5.61 | 4.92 | 4.94 | 4.99 | — |
| | Leachate metals, mg/L | | | | | |
| Ag | <0.1 | <0.1 | <0.1 | <0.1 | <0.1 | 5.0[1,2] |
| As | <0.1 | <0.1 | <0.1 | <0.1 | <0.1 | 5.0[1,2] |
| B | 0.2 | <0.1 | <0.1 | <0.1 | <0.1 | 500.0[2] |
| Ba | <0.1 | <0.1 | <0.1 | <0.1 | <0.1 | 100.0[1,2] |
| Cd | 0.7 | 2.4 | 1.2 | 1.9 | 0.8 | 1.0[1,2] |
| Co | 2.5 | 3.0 | 3.4 | 6.2 | 2.5 | 100.0[1] |
| Cr | <0.1 | <0.1 | <0.1 | <0.1 | <0.1 | 5.0[1,2] |
| Cu | 66.1 | 16.8 | 27.4 | 40.0 | 43.9 | 100.0[1] |
| Fe | 1.2 | <0.5 | 1.0 | 0.6 | 0.7 | 1000.0[1] |
| Ni | 4.3 | 2.4 | 6.8 | 9.1 | 4.1 | 5.0[2] |
| Pb | <0.1 | <0.1 | <0.1 | <0.1 | <0.1 | 5.0[1,2] |
| Se | <0.1 | <0.1 | <0.1 | <0.1 | <0.1 | 1.0[1,2] |
| Tl | <0.1 | <0.1 | <0.1 | <0.1 | <0.1 | 5.0[2] |
| U | 0.3 | <0.1 | 0.1 | 0.1 | 0.2 | 2.0[2] |
| V | <0.1 | <0.1 | <0.1 | <0.1 | <0.1 | 100.0[2] |
| Zn | 105 | 123 | 112 | 196 | 94.8 | 500.0[2] |
| Zr | <0.1 | <0.1 | <0.1 | <0.1 | <0.1 | 500.0[2] |

Note:
[1]EPA Hazardous Wastes - Ref. EPA Publication SW-846.
[2]Alberta User Guide for Waste Managers - Schedule 3/95, Part 4.2–4.4 (Alberta Environmental Protection, Air and Water Approval Division.)

The results show that: (1) AMW containing extremely high levels of heavy metals can be effectively reduced to an acceptable level. In particular, high levels of Al (960 mg/L) and Mn (181 mg/L) can be reduced to a level of <0.2 mg/L and 0.36 mg/L respectively (see TP-7). (2) The addition of small amounts of acidic sludge can remove the heavy metals at the pH range of 7.5 to 9.2 (see TP-2 to -7). The higher pH level favors Mn removal to produce a lower level of Mn in the effluent. (3) The lime consumption is directly affected by the amounts of recycled acidic sludge and the final pH level of the effluent. (4) Comparing the results for the trials of TP-2 to -7 with the conventional treatment using lime neutralization to pH 7.9-8.0 (see CLNT in Table 1), the lime consumption can be greatly reduced, at an average of 39.3% and the sludge disposal amounts were reduced at an average of 29.7% (5) The acidic sludge (pH 4-5) has an enhanced stability for disposal, which can pass the test of TCLP extraction performed at pH 4.9. The levels for each leachable metal in the acidic sludges formed under the conditions in trials P-3 and P-7 were lower than the limits set by United States Environmental Protection Agency and the Province of Alberta, Canada.

Example 2

Three trials were carried out using the procedure described in Example 1 except that the lignosulfonates employed were calcium lignosulfonate rather than sodium lignosulfonates. The basic sludge obtained from the preliminary LACM method (Table 1) was used for the first pretreatment (P-8). Table 5 lists the data for the pretreatment trials, identified as P-8 to P-10 and pretreatment trials, identified as TP-8 to TP-10. Table 6 lists the levels for leachable metals in the acidic sludge from the pretreatment trials.

TABLE 5

The Pretreatment and Treatment Data for Example 2

|  |  | Pretreatment | | | Treatment | | |
|---|---|---|---|---|---|---|---|
|  |  | P-8 | P-9 | P-10 | TP-8 | TP-9 | TP-10 |
| Treatment chemicals used | Calcium Lignosulfonates, g/L | — | — | — | 0.041 | 0.041 | 0.039 |
|  | Hydrated lime, g/L | 4.501 | 2.072 | 2.071 | 1.247 | 4.612 | 3.598 |
|  | $FeCl_2$ (100%), g/L | — | — | — | 0 | 0.128 | 0.128 |
|  | Acidic sludge mass, g/L | — | — | — | 0.32 | 0.36 | 0.46 |
|  | Basic sludge mass, g/L | 26.4 | 2.52 | 13.4 | — | — | — |
| Sludge[1] | TSS, mg/L | — | — | — | 24 | 36 | 26 |
|  | Sludge mass, g/L | 4.31 | 9.37 | 22.24 | 2.84 | 13.79 | 9.98 |
|  | Sludge disposal mass, g/L | 40.99 | 9.01 | 21.79 | 0 | 0 | 0 |
| pH | Influent (AMW) 2.4–2.6 |  |  |  |  |  |  |
|  | Effluent: | 6.29 | 4.11 | 4.39 | 8.5–8.7 | 8.3–8.4 | 8.8–9.1 |
| Metals | Dissolved metals in influent (mg/L) | Dissolved metals in effluent (mg(L) | | | | | |
| Al | 960 | <0.2 | 419 | 110 | 0.2 | 1.7 | <0.2 |
| As | 3.0 | <0.2 | <0.2 | <0.2 | <0.2 | <0.2 | <0.2 |
| Ca | 459 | 431 | 581 | 462 | 939 | 706 | 772 |
| Cd | 1.62 | 0.54 | 1.27 | 2.27 | <0.01 | <0.01 | <0.01 |
| Co | 5.15 | 1.89 | 4.00 | 7.12 | <0.05 | <0.05 | <0.05 |
| Cr | 0.33 | <0.05 | <0.05 | <0.05 | <0.05 | <0.05 | <0.05 |
| Cu | 82.4 | 0.1 | 46.6 | 47.8 | <0.1 | <0.1 | <0.1 |
| Fe | 957 | <0.1 | 3.4 | 0.4 | <0.1 | <0.1 | <0.1 |
| Mg | 1310 | 1211 | 1022 | 1457 | 645 | 590 | 855 |
| Mn | 181 | 160 | 179 | 261 | 1.26 | 1.44 | 0.20 |
| Ni | 10.8 | 3.69 | 8.01 | 14.07 | <0.05 | <0.05 | <0.05 |
| P (as $PO_4^{-3}$) | 74.8 | <0.9 | <0.9 | <0.9 | <0.9 | <0.9 | <0.9 |
| Pb | <0.2 | <0.2 | <0.2 | <0.2 | <0.2 | <0.2 | <0.2 |
| S (as $SO_4^{-2}$) | 13110 | 6393 | 7982 | 8420 | 4913 | 4101 | 5417 |
| Sb | <0.2 | <0.2 | <0.2 | <0.2 | <0.2 | <0.2 | <0.2 |
| Si | 33.5 | 2.2 | 15.3 | 13.4 | 0.8 | <0.5 | 0.6 |
| Zn | 178 | 8.73 | 120 | 228 | <0.05 | <0.05 | <0.05 |

Note:
[1]The acidic sludge is generated in the pretreatment, and the basic sludge is produced in the treatment.

TABLE 6

The TCLP Data for the Acidic Sludge of Example 2

|  | Acidic Sludge # | | | |
|---|---|---|---|---|
|  | P-8 | P-9 | P-10 | Regulatory Limit[1,2] |
| Solids % | 92.5 | 90.8 | 91.8 | — |
| Final pH of leachate | 5.77 | 4.82 | 4.86 | — |
|  | Leachate metals, mg/L | | | |
| Ag | <0.1 | <0.1 | <0.1 | 5.0[1,2] |
| As | <0.1 | <0.1 | <0.1 | 5.0[1,2] |
| B | <0.1 | 0.2 | <0.1 | 500.0[2] |
| Ba | <0.1 | <0.1 | <0.1 | 100.0[1,2] |
| Cd | 1.8 | 0.5 | 0.1 | 1.0[1,2] |
| Co | 3.4 | 1.4 | 0.7 | 100.0[1] |
| Cr | <0.1 | <0.1 | <0.1 | 5.0[1,2] |
| Cu | 3.3 | 12.3 | 28.7 | 100.0[1] |
| Fe | <0.5 | 0.6 | 1.3 | 1000.0[1] |
| Ni | 4.0 | 3.0 | 1.5 | 5.0[2] |
| Pb | <0.1 | <0.1 | <0.1 | 5.0[1,2] |

TABLE 6-continued

The TCLP Data for the Acidic Sludge of Example 2

| | Acidic Sludge # | | | |
|---|---|---|---|---|
| | P-8 | P-9 | P-10 | Regulatory Limit[1,2] |
| Se | <0.1 | <0.1 | <0.1 | 1.0[1,2] |
| Tl | <0.1 | <0.1 | <0.1 | 5.0[2] |
| U | <0.1 | <0.1 | <0.1 | 2.0[2] |
| V | <0.1 | <0.1 | <0.1 | 100.0[2] |
| Zn | 55.7 | 30.3 | 30.3 | 500.0[2] |
| Zr | <0.1 | <0.1 | <0.1 | 500.0[2] |

Note:
[1]EPA Hazardous Wastes - Ref. EPA Publication SW-846.
[2]Alberta User Guide for Waste Managers - Schedule 3/95, Part 4.2–4.4 (Alberta Environmental Protection, Air and Water Approval Division.)

The TCLP test data shows that the acidic sludge produced has higher stability than the acidic sludges of Example 1. They liberated much lower levels of Cd, Co, Ni and Zn.

Example 3

Three continuous trials of the two-stage treatment of the inventions were performed under various conditions without using any lignosulfonates. Similar to Examples 1 and 2, the basic sludge separated from the previous trial was mixed with hydrated lime prior to being used for the pretreatment of the next trial. The basic sludge obtained from the CLNT method (Table 1) was used for the first pretreatment (P-11). The test data are recorded in Table 7.

Using the procedure described in Example 1, the dissolved metals in the pretreated AMW and in the effluent were determined by the standard ICP method. The results show that the two-stage treatment without lignosulfonates can satisfactorily reduce the target metals to low levels at a final pH level of 9.2-9.4, and also reduce the lime consumption by an average of 29.9% compared to normal one-stage lime treatment (see CLNT, Table 1). However, the TSS in the effluent is greater than the limit of 50 mg/L. It is noted that all comparison tests (Tables 1, 3, 5 and 7) show that the application of lignosulfonates could produce lower levels of calcium and sulfate in water. Without lignosulfonates, the higher levels of calcium and sulfate were observed to gradually form fine white particles of gypsum, resulting in high levels of TSS.

TABLE 7

The Pretreatment and Treatment Data for Example 3

| | | Trial No. | | | | | |
|---|---|---|---|---|---|---|---|
| | | Pretreatment | | | Treatment | | |
| | | P-11 | P-12 | P-13 | TP-11 | TP-12 | TP-13 |
| Treatment chemical used | Hydrated lime, g/L | 1.992 | 1.999 | 2.008 | 5.289 | 4.401 | 3.701 |
| | FeCl$_2$ (100%), g/L | — | — | — | 0 | 0 | 0.158 |
| | Acidic sludge mass, g/L | — | — | — | 0.49 | 0.36 | 0.30 |
| | Basic sludge mass, g/L | 17.81 | 16.8 | 11.8 | — | — | — |
| Sludge[1] | TSS, mg/L | — | — | — | 41 | 66 | 66 |
| | Sludge mass, g/L | 24.14 | 25.67 | 17.69 | 17.28 | 12.12 | 12.77 |
| | Sludge disposal mass, g/L | 23.65 | 25.31 | 17.39 | 0 | 0 | 0 |
| pH | Influent (ARD) 2.4–2.6 | | | | | | |
| | Effluent: | 4.12 | 4.48 | 5.54 | 8.3–8.5 | 9.3–9.4 | 9.2–9.4 |

| Metals | Dissolved metals in influent (mg/L) | Dissolved metals in effluent (mg/L) | | | | | |
|---|---|---|---|---|---|---|---|
| Al | 960 | 503 | 67.7 | 4.0 | 1.1 | <0.2 | <0.2 |
| As | 3.0 | <0.2 | <0.2 | <0.2 | <0.2 | <0.2 | <0.2 |
| Ca | 459 | 491 | 475 | 450 | 574 | 1146 | 1260 |
| Cd | 1.62 | 2.35 | 3.15 | 3.43 | <0.01 | <0.01 | 0.01 |
| Co | 5.15 | 6.81 | 9.13 | 9.90 | <0.05 | <0.05 | <0.05 |
| Cr | 0.33 | <0.05 | <0.05 | <0.05 | <0.05 | <0.05 | <0.05 |
| Cu | 82.4 | 31.4 | 16.0 | 5.9 | <0.1 | <0.1 | <0.1 |
| Fe | 957 | 7.7 | 0.15 | <0.1 | <0.1 | <0.1 | <0.1 |
| Mg | 1310 | 1568 | 1749 | 1916 | 723 | 649 | 1280 |
| Mn | 181 | 245 | 269 | 257 | 1.43 | 0.09 | 0.11 |
| Ni | 10.8 | 13.71 | 17.66 | 17.88 | <0.05 | <0.05 | <0.05 |
| P (as PO$_4^{-3}$) | 74.8 | 2.4 | <0.9 | <0.9 | <0.9 | <0.9 | <0.9 |
| Pb | <0.2 | <0.2 | <0.2 | <0.2 | <0.2 | <0.2 | <0.2 |
| S (as SO$_4^{-2}$) | 13110 | 10505 | 9294 | 9522 | 4301 | 5387 | 8084 |
| Sb | <0.2 | <0.2 | <0.2 | <0.2 | <0.2 | <0.2 | <0.2 |
| Si | 33.5 | 27.2 | 15.2 | 7.5 | <0.5 | 0.8 | 0.5 |
| Zn | 178 | 205 | 266 | 286 | <0.05 | <0.05 | <0.05 |

Note:
[1]The acidic sludge is generated in the pretreatment, and the basic sludge is produced in the treatment.

What is claimed is:

1. A method for removing metals from metal-containing acidic mine wastewater, in which a basic sludge produced by said method is used in treating said wastewater, comprising the steps of:
   (a) mixing said wastewater with a lime slurry and with said basic sludge to form a mixture having a pH in the range of 4 to 6;
   (b) allowing said mixture to separate into an aqueous effluent and an acidic sludge to remove said metals, said acidic sludge containing ferric iron and stable metal precipitates;
   (c) sending said acidic sludge to disposal, wherein a portion of said acidic sludge is recycled;
   (d) mixing said aqueous effluent of step (b) with a lime slurry, lignin derivatives, and said portion of acidic sludge, to produce a mixture including coprecipitated metals; and
   (e) allowing said mixture of step (d) to separate into an aqueous effluent and said basic sludge, wherein said basic sludge contains unstable metal precipitates.

2. A method according to claim 1, further comprising the step of adding a ferrous salt solution to the mixture of step (d).

3. A method according to claim 1, further comprising the step of adding a ferric salt solution to the mixture of step (d).

4. A method according to claim 1 wherein said mixture of step (a) has a pH in the range of 4.3 to 5.

5. A method according to claim 1 wherein said mixing with lignin derivatives is carried out under aeration.

6. A method according to claim 1 wherein said mixing of step (d) is carried out under aeration.

7. A method according to claim 1, wherein the portion of said acidic sludge used in step (d) is in the range of 1 to 10% by weight.

8. A method according to claim 1, wherein the portion of said acidic sludge used in step (d) is in the range of 4 to 8% by weight.

9. A method according to claim 1 wherein said lignin derivatives comprise calcium lignosulfonate.

* * * * *